(12) United States Patent
Droege et al.

(10) Patent No.: US 9,802,329 B2
(45) Date of Patent: Oct. 31, 2017

(54) DEVICE FOR CUTTING EXTRUDED PLASTIC PROFILES TO LENGTH

(71) Applicant: battenfeld-cincinnati Germany GmbH, Bad Oeyenhausen (DE)

(72) Inventors: Joerg Droege, Kerken (DE); Christian von Hippel, Kempen (DE)

(73) Assignee: BATTENFELD-CINCINNATI GERMANY GMBH, Bad Oeyenhausen (DE)

( * ) Notice: Subject to any disclaimer, the term of this patent is extended or adjusted under 35 U.S.C. 154(b) by 24 days.

(21) Appl. No.: 15/028,741

(22) PCT Filed: Oct. 10, 2014

(86) PCT No.: PCT/EP2014/071821
§ 371 (c)(1),
(2) Date: May 9, 2016

(87) PCT Pub. No.: WO2015/052340
PCT Pub. Date: Apr. 16, 2015

(65) Prior Publication Data
US 2016/0243712 A1   Aug. 25, 2016

(30) Foreign Application Priority Data
Oct. 12, 2013   (DE) ........................ 10 2013 220 621

(51) Int. Cl.
*B23B 5/14* (2006.01)
*B26D 1/60* (2006.01)
(Continued)

(52) U.S. Cl.
CPC ................. *B26D 1/60* (2013.01); *B26D 3/16* (2013.01); *B26D 5/04* (2013.01); *B29C 47/0023* (2013.01);
(Continued)

(58) Field of Classification Search
CPC .... B23B 5/14; B23B 5/16; B23B 3/22; B23B 3/26; Y10T 82/16; Y10T 82/16655;
(Continued)

(56) References Cited

U.S. PATENT DOCUMENTS 2,842,238 A * 7/1958 Shaw ..................... B23D 21/04
                                                            30/101
4,235,137 A    11/1980 Harman
(Continued)

FOREIGN PATENT DOCUMENTS

DE           20104200 U1    6/2001

*Primary Examiner* — Daniel Howell
*Assistant Examiner* — Nicole N Ramos
(74) *Attorney, Agent, or Firm* — Leydig, Voit & Mayer, Ltd.

(57) ABSTRACT

A device for cutting a preferably thick-walled, extended pipe to length, has at least one cutting tool and a receiving unit for the cutting tool. The cutting tool is radially movable in relation to the extrusion axis and is rotatable via further means about the pipe to be cut to length, in order to cut the pipe to length. The receiving unit may be connected by means of a receiving disc to a sleeve via a ring element, wherein linear guiding elements are arranged on said sleeve parallel to the extrusion axis, and wherein at least four linear guiding elements are evenly distributed around the circumference of the sleeve.

3 Claims, 2 Drawing Sheets

(51) Int. Cl.
*B29C 47/00* (2006.01)
*B26D 3/16* (2006.01)
*B26D 5/04* (2006.01)
*B29C 47/34* (2006.01)
*B29C 47/88* (2006.01)
*B29C 47/90* (2006.01)
*B23B 3/26* (2006.01)
*B26D 1/18* (2006.01)
*B26D 5/08* (2006.01)
*B29L 23/00* (2006.01)

(52) U.S. Cl.
CPC .......... *B29C 47/0066* (2013.01); *B29C 47/34* (2013.01); *B29C 47/882* (2013.01); *B29C 47/90* (2013.01); *B23B 3/26* (2013.01); *B23B 5/14* (2013.01); *B26D 1/18* (2013.01); *B26D 5/08* (2013.01); *B29C 47/8835* (2013.01); *B29C 47/8895* (2013.01); *B29C 47/905* (2013.01); *B29C 2793/009* (2013.01); *B29C 2793/0027* (2013.01); *B29L 2023/00* (2013.01); *Y10T 82/16* (2015.01); *Y10T 82/16754* (2015.01)

(58) Field of Classification Search
CPC ......... Y10T 82/16754; Y10T 82/16803; Y10T 82/16819; Y10T 82/16951; Y10T 82/22; Y10T 82/2522; Y10T 82/2527
See application file for complete search history.

(56) References Cited

U.S. PATENT DOCUMENTS

| | | | |
|---|---|---|---|
| 4,430,913 A * | 2/1984 | Williamson | B23B 5/163 82/59 |
| 4,807,502 A | 2/1989 | Clark et al. | |
| 5,056,389 A * | 10/1991 | Johnstead | B23B 3/26 409/177 |
| 5,189,933 A * | 3/1993 | Ricci | B23B 3/26 30/97 |
| 5,660,093 A * | 8/1997 | Ricci | B23B 5/00 82/113 |
| 6,901,828 B2 * | 6/2005 | Ricci | B23B 3/26 82/113 |
| 8,051,753 B2 * | 11/2011 | Ricci | B23B 5/38 82/113 |

* cited by examiner

DEVICE FOR CUTTING EXTRUDED PLASTIC PROFILES TO LENGTH

CROSS-REFERENCE TO RELATED APPLICATIONS

This application is a U.S. national stage application under 35 U.S.C. §371 of International Application No. PCT/EP2014/071821, filed on Oct. 10, 2014, and claims benefit to German Patent Application No. DE 10 2013 220 621.6, filed on Oct. 12, 2013. The International Application was published in German on Apr. 16, 2015, as WO 2015/052340 A1 under PCT Article 21(2).

FIELD

The invention relates to a device for cutting to length an extruded tube that preferably has thick walls.

In order to cut to length extruded tubes, what are known as flying saws are usually used, a circular saw blade being brought towards the tube to be sawed from below (underfloor saw), from above (plunge saw), or from the side (crosscut saw), plunging into the cross section of the tube, and cutting through the wall thickness in a first step. In a second step, the saw blade is guided around the tube in order to fully cut the tube to length. In this case, the tube that is to be cut to length is clamped during the sawing process. The saw carriage then moves at the extrusion speed synchronously with the continuously progressing extrusion process ("flying saw").

When tubes are sawed, sawdust is produced. In addition, a static charge is generated due to the friction of the saw blade on the tube, in particular in the case of a plastics tube. This is disadvantageous in that the sawdust adheres to the tube, resulting in contamination. The waste material produced often has to be declared as hazardous waste, meaning that it cannot be recycled.

A device in which tubes are cut to length in a chipless manner is already used for small tubes. Rather than a running saw, a round knife is guided around the tube until the tube wall has been cut through.

The chipless cutting just mentioned makes it possible to cleanly cut small tube diameters having a thin cross section, but it has hitherto not been successful in also cutting to length thick-walled tubes having large or very large diameters, i.e. diameters of approximately 2 m. For these tubes, recourse is always made to the saws mentioned further up, resulting in the known disadvantages.

Tests have shown that the main problem lies in precisely guiding the knives through the thick-walled tube. On account of the large thickness and the large diameter, even at the smallest inclination of the knife said knife is canted in the material, which results in the knife breaking.

For cutting units of this kind, the market requirements are for a high linear speed at short cutting lengths and the option of applying a chamfer, for example in sewage pipes made of PP/PVC. Although automatic cutting machines are known that can carry out the cutting process very rapidly, said machines usually have the disadvantage that they cannot produce chamfers or that they are not suitable for all types of plastics material. However, automatic cutting machines which can produce chamfers usually have a comparatively large saw carriage and are therefore slow. The time required to make a cut is thus very long.

In the current machines such as saws (flying saws), tubes having a wide range of diameters are cut through by a cutting knife arm or a saw arm moving around the tube. All the functions necessary for this purpose, such as moving the arm forward and back, clamping/releasing the tube, and the corresponding position feedback are installed on the disc rotating about the tube. For this purpose, slip rings are used for the electrical signals. The usual procedure is to use a dedicated slip ring channel for each signal respectively. The signals, and thus the available functions, are limited by the structural size in smaller machines and by the cost per slip ring.

A solution to the above-described problem is disclosed in DE 20 104 200, but does not yet provide satisfactory results. In this case, an axial movement is achieved by means of a designed as a bearing sleeve, the accuracy of which is achieved only by ensuring precise manufacture using smooth and hardened surfaces.

SUMMARY

An aspect of the invention provides a device for cutting to length an extruded tube, the device comprising: a cutting tool; and a support unit for the cutting tool, wherein the cutting tool is radially movable with respect to an extrusion axis, wherein the cutting tool is further rotatable, by a further unit, about the tube to be cut to length, in order to cut the tube to length, wherein the support unit is connected via a support disc to a sleeve by an annular element, wherein linear guide elements are arranged on the sleeve in parallel with the extrusion axis, and wherein at least four linear guide elements are evenly distributed over a periphery of the sleeve.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The invention relates to a device for cutting to length an extruded tube that preferably has thick walls, comprising at least one cutting tool and a support unit for the cutting tool, the cutting tool being radially movable with respect to the extrusion axis and being rotatable by further means about the tube that is to be cut to length in order to cut the tube to length.

An aspect of the invention is therefore that of developing the known specialized knowledge about a generic cutting device provided with a knife, such that it is possible to provide a device that is more simply constructed and is thus more cost-effective to produce.

An aspect of the invention is characterized in that the support unit is connected via a support disc to a sleeve by means of an annular element, linear guide elements being arranged on the sleeve in parallel with the extrusion axis, at least four linear guide elements being evenly distributed over the periphery of the sleeve.

Linear guide elements of this kind make a hardened and smooth surface of the annular element superfluous; it is sufficient to exactly position the linear guides on the periphery of the annular element.

According to a development, the annular element is guided axially by means of the linear guide elements. In this case, it is provided for the linear guide elements to be commercially available linear guide profiles.

Figure 1:
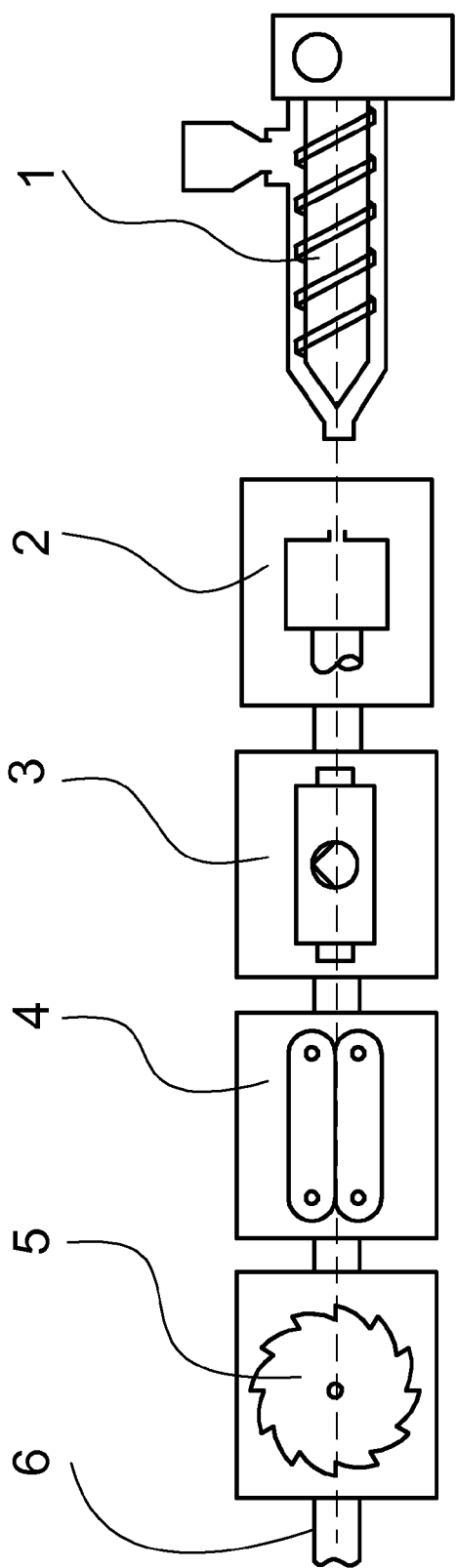
FIG. 1 shows a typical extrusion line

FIG. 1 shows a typical extrusion line as used currently for profile extrusion, regardless of whether said line is used for producing window profiles or tubes. The figure shows an extruder 1, in which plastics material is melted and continuously conveyed into the extrusion die 2 to be shaped. The die is followed by a calibrating and cooling station 3; depending on the profile, further cooling stations can be used. Downstream of the cooling stations is a take-off device 4. A cutting device 5 is arranged thereafter for cutting the continuous profiles 6 to the desired length.

Figure 2:
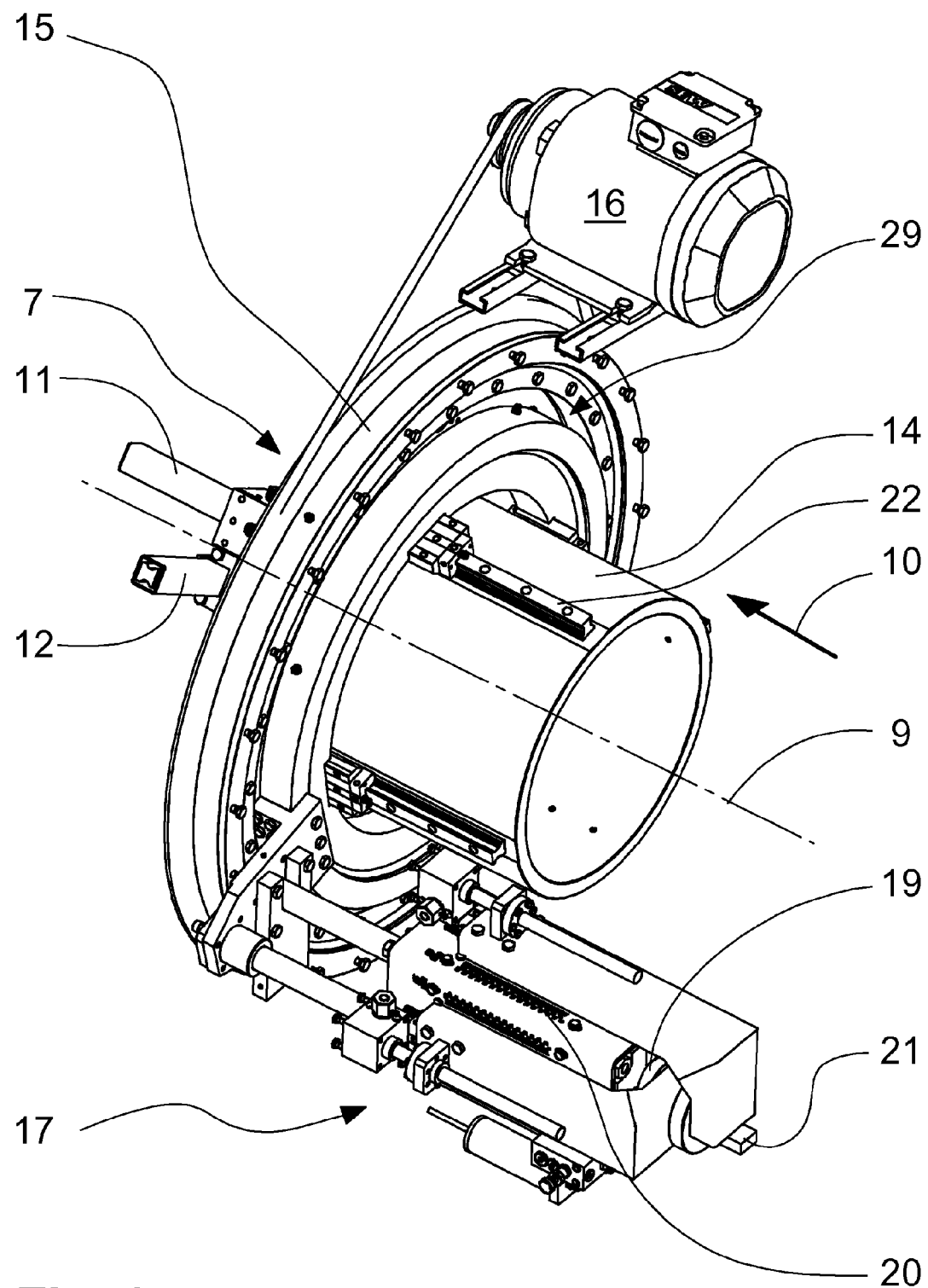
FIG. 2 shows the part of the cutting device

FIG. 2 is a schematic view of the cutting device according to the invention, and corresponds to position 5 according to the view in FIG. 1. A sleeve 14 comprising linear guides 22 is arranged about the extrusion axis 9 and is operatively connected to an annular element 29. Cutting tools 7 that are adjusted by means of racks 11 and 12 are arranged on the support disc 15.

The annular element 29 is thus moved axially along the extrusion axis 9 by means of the linear guide elements 22 mounted on the sleeve 14.

The annular element 29 can be moved along the extrusion axis 9 in or counter to the extrusion direction 10. In order to move the annular element 29, an axial drive 17 is provided that is likewise operatively connected to the annular element 29. A pneumatic cylinder 19, the direction of which is changed by means of limit switches 21, is used as the drive. A scale 20 is used to specify the position of the limit switches 21 in the event of manual adjustment.

The rotary drive 16 for the support disc 15 is also shown.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

1 Extruder
2 Extrusion die
3 Calibrating and cooling tank
4 Take-off device
5 Cutting device
6 Profile
7 Cutting tool
9 Extrusion axis
10 Extrusion direction
11 first rack (parallel)
12 second rack (radial)
14 Sleeve
15 Support disc
16 Rotary drive for 15
17 Axial drive for 29
19 Pneumatic cylinder
20 Scale
21 Limit switches
22 Linear guide
29 Annular element

The invention claimed is:

1. A device for cutting to length an extruded tube, the device comprising:
 a cutting tool; and
 a support unit for the cutting tool,
 wherein the cutting tool is radially movable with respect to an extrusion axis,
 wherein the cutting tool is further rotatable, by a further unit, about the tube to be cut to length, in order to cut the tube to length,
 wherein the support unit is connected via a support disc to a sleeve by an annular element,
 wherein linear guide elements are arranged on the sleeve in parallel with the extrusion axis, and
 wherein at least four linear guide elements are evenly distributed over a periphery of the sleeve.

2. The device claim 1, wherein the annular element can be guided axially by one or more of the linear guide elements.

3. The device claim 2, wherein the linear guide elements are commercially available linear guide profiles.

* * * * *